F. B. RAE.
ELECTRIC MOTOR GENERATOR FOR STARTING AND LIGHTING GASOLENE AUTOMOBILES.
APPLICATION FILED JUNE 7, 1915.
1,375,319.
Patented Apr. 19, 1921.
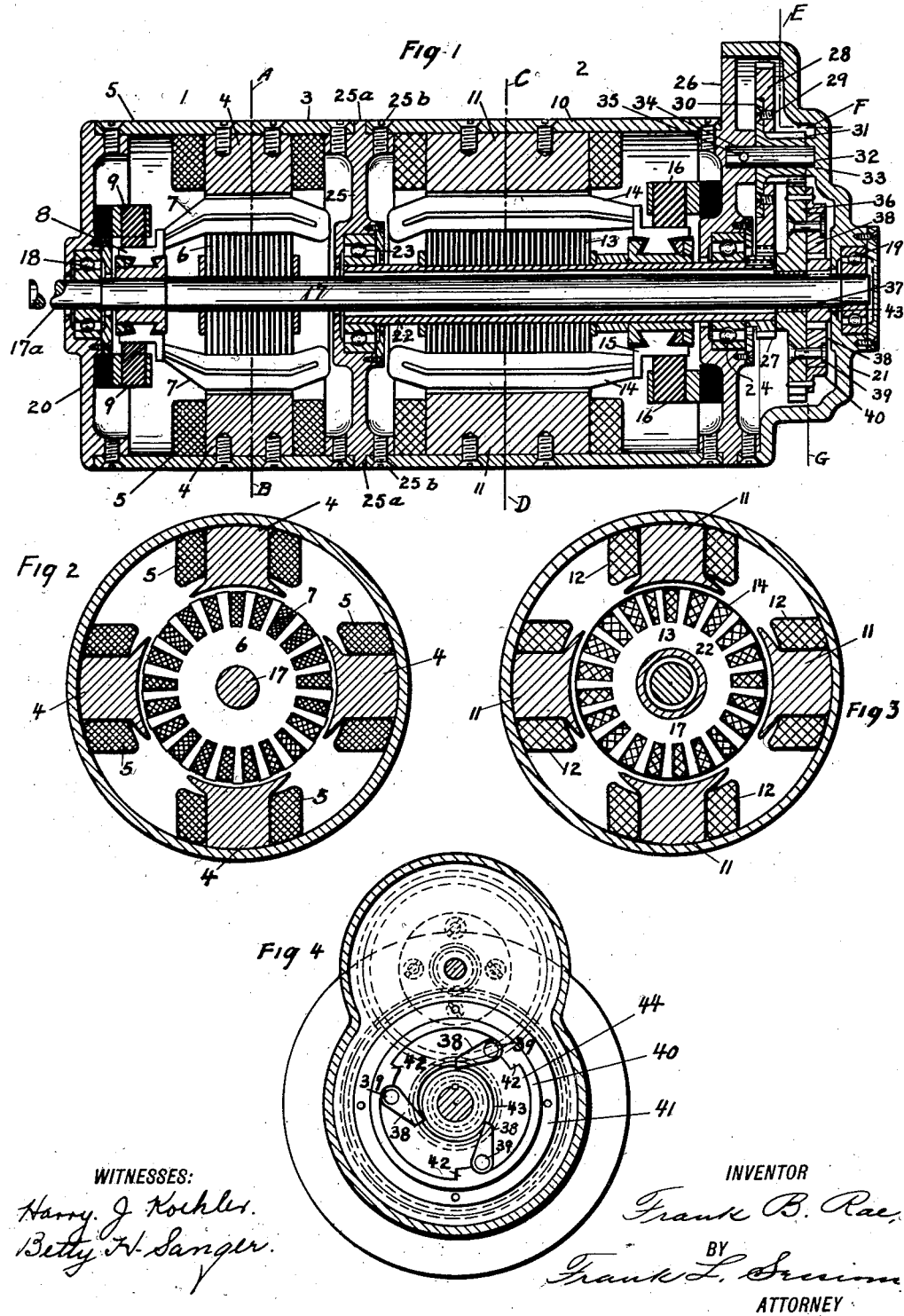
WITNESSES:
INVENTOR
ATTORNEY

UNITED STATES PATENT OFFICE.

FRANK B. RAE, OF CLEVELAND, OHIO.

ELECTRIC-MOTOR GENERATOR FOR STARTING AND LIGHTING GASOLENE-AUTOMOBILES.

1,375,319.   Specification of Letters Patent.   Patented Apr. 19, 1921.

Application filed June 7, 1915. Serial No. 32,771.

*To all whom it may concern:*

Be it known that I, FRANK B. RAE, a citizen of the United States, residing at Cleveland, in the county of Cuyahoga and State of Ohio, have invented certain new and useful Improvements in Electric-Motor Generators for Starting and Lighting Gasolene-Automobiles, of which the following is a specification.

This invention relates to electric motor generators for starting and lighting gasolene automobiles and has particular reference to the so called two unit system in which an electric motor is employed for starting the gasolene engine which drives the automobile and an electric generator is driven by the gasolene engine for producing current with which to charge an electric storage battery, or to light the lamps of the automobile, or to furnish energy for the ignition requirements of the gasolene engine, or to do all of these things simultaneously.

It contemplates the combination, in a particular way, of an electric motor, an electric generator and a gasolene engine arranged in a mechanical series, the generator armature being located between the electric motor and the gasolene engine and having its shaft at one end in driving connection with the shaft of the gasolene engine and at the other end connected to the motor armature shaft through an overrunning clutch and reduction gearing, the overrunning clutch being located between the generator armature shaft and the reduction gearing.

More specifically this invention relates to the mechanical construction and arrangement of parts of the starting motor and the lighting generator which are contained in a practically continuous casing of one diameter and whose parts are so disposed that the motor part operates to drive a shaft common to both motor and generator and the generator armature is carried upon and driven by this common shaft.

The invention provides a construction in which the motor armature may revolve at a relatively high speed and transmit motion through reduction gearing to the common shaft, causing it to revolve at a relatively slow speed, thereby multiplying the motor torque delivered to the common shaft.

The invention further provides an electric generator for the purposes stated, the generator armature being directly mounted upon and revolved with the common shaft.

The invention further provides adequate reduction gearing within the least possible diameter and space. This permits the use of my motor generator in the extremely limited space available for such apparatus in automobiles, yet without sacrificing either electrical or mechanical efficiency or the necessary strength of the component parts.

The invention further provides an overrunning clutch mechanism between the common shaft upon which the generator armature is mounted, and the motor reduction gearing, arranged so that rotation of the motor armature in its prescribed direction will cause the common shaft to revolve, but the rotation of the common shaft in its prescribed direction will not be transmitted to the gearing and the motor armature.

It will be evident to one skilled in the art that with my arrangement of parts the motor armature and gearing will not revolve after the energizing current is disconnected from the motor, but the generator armature will continue to revolve as long as the gasolene engine revolves and may be employed to produce the energy required for the objects referred to. These, as well as other objects for which my invention may be suitable, are attained by the construction illustrated in the accompanying drawings in which Figure 1 shows a longitudinal cross section of my motor generator; Fig. 2 shows a cross section through the generator on line A—B; Fig. 3 shows a cross section through the motor on line C—D; and Fig. 4 shows a cross section on line E—F—G.

Referring to the drawings, 1 represents the generator portion, and 2 the motor portion, considered as separate electrical units, the revolving armatures of which are interconnected by gearing which will be presently described. As shown, 1 and 2, electrically considered, are ordinary four pole, direct current dynamos.

The principal parts of the generator portion, 1, which have electrical or magnetic functions are, the iron casing, 3, which is also the field yoke ring; the pole pieces, 4;

the field coils, 5; the armature core, 6; the armature coils, 7; the commutator, 8; and the commutator brushes, 9.

The corresponding parts of the motor portion, 2, are, the iron casing and field yoke ring, 10; the pole pieces, 11; the field coils, 12; the armature core, 13; the armature coils, 14; the commutator, 15; and the commutator brushes, 16.

The generator armature core, 6, and the commutator, 8, are mounted upon and have suitable driving connections with the revolving shaft, 17, which is carried by ball bearings, 18 and 19, in the end housings, 20 and 21.

The motor armature core, 13, and commutator, 15, are mounted upon and have suitable driving connections with the revolving hollow shaft, 22, which is carried by ball bearings, 23 and 24, in the intermediate housings, 25 and 26.

The iron casings, 3 and 10, are accurately bored to receive the turned portions of the field pole pieces, 4 and 11, and the bearing housings, 20, 25 and 26, while the housing, 21, is accurately alined with them and is firmly secured to housing, 26.

A toothed pinion, 27, is mounted upon and keyed to the end of the hollow shaft, 22. Pinion 27 meshes with gear, 28, which, for the purpose of economizing space is made in the form of a disk, and is bolted by screws, 29, to a flange, 30, formed at one end of a toothed pinion, 31. 31 is rotatively mounted upon the stationary shaft or pin, 32, which is supported at 33 and 34 in suitable sockets formed in housings 21 and 26 respectively. Shaft 32 is prevented from rotating by a pin, 35, which passes through it and the metal surrounding socket 34. The pinion, 31, meshes with a gear, 36, the nave of which is bushed at 37 to form a rotative bearing upon shaft 17.

Upon one side of the gear, 36, pawls, 38, are pivoted on pins, 39, which are rigidly secured in the metal web of gear 36. Inclosing pawls, 38, is a metal ring, 40, provided with a flange, 41, which is bolted or otherwise secured to the side of gear 36. Projecting radially inward from ring 40 and integral therewith are lugs, 42, which bear against the rounded hubs of pawls, 38, and serve to assist the pins, 39, in transmitting the driving effort of the motor to the common shaft, 17. Small springs of any convenient form may be employed to force the pawls into engagement with the teeth of the ratchet, 43, which is mounted upon and keyed to shaft 17.

The ratchet, 43, and the pawls, 38, as organized, constitute the overrunning clutch referred to in this specification and are collectively numbered 44 on the drawings.

The projecting end, 17a, of shaft 17 is provided so that any desirable and convenient driving connection from it to the shaft of the gasolene engine may be made. This connection may be a direct coupling or any form of geared connection known to skilled mechanics and designers.

The operation of my invention is as follows:—

Assuming that the shaft, 17, is in driving connection with the shaft of a gasolene engine, and that the motor is properly connected, electrically, through any suitable controlling devices with a source of electric current, the circuit through the motor being made, the motor armature will rotate and its motion will be transmitted through its shaft, 22, gears, 27, 28, 31, 35, pawls, 38, and ratchet, 43, to shaft, 17, which, in turn, will transmit the motion to the shaft of the gasolene engine. It will be understood that the speed of shaft 17 will be much less than that of the motor armature, and that the torque of shaft 17 will be relatively much greater than that of the motor.

As soon as the gasolene engine starts to operate by the ignition and explosion of gases in its cylinders, its shaft will rotate at a higher speed than that imparted by the shaft, 17, when driven by the electric motor, 2, and, in consequence, shaft 17 will be driven by the engine shaft instead of by the electric motor.

The ratchet, 43, revolving at a faster speed than the pawls, 38, no driving force will be transmitted through the overrunning clutch, 44, and, if the motor be now electrically disconnected from its source of current, the motor armature and the train of gears between it and the ratchet, 43, will come to rest.

It is obvious that if the electrical connections of the generator, 1, are properly made, electro-motive force will be developed in its armature when rotated and electric current may be conducted from the brushes, 9, and utilized as desired.

Some details of electrical connections and mechanical construction which have no direct bearing upon this invention are not shown in the drawings but they will be obvious to those skilled in the art. For instance, the iron casings and field yoke rings, 3 and 10, will be cut away over the commutator brushes and covers provided which will permit the brushes to be inspected and adjusted; and suitable openings will be provided for the entrance of the electrical conductors which connect the motor and generator to their external circuits.

Modifications of the construction shown may be made without departing from the scope of my invention. For instance, it may be preferred to make the iron casings, 3 and 10, of a single piece instead of two separate cylinders. In such case the flange, 25a, of housing 25 would be dispensed with, but the housing would still be secured by the screws, 25^b, or some suitable substitute fastening means.

I am aware that various constructions of electric motors and generators for starting and lighting gasolene automobiles have been proposed. One of the difficulties which I have observed in the design of such equipment is the difference in the torque and rotative speed of the motor required to crank the gasolene engine as compared to the torque and rotative speed required to be developed in a generator for properly charging a storage battery for storing the necessary energy for lighting, cranking and ignition purposes. In instances where the same electric dynamo is used both as a generator and as a motor, known as the single unit system, the dynamo must be much larger than either of the units of a two unit system, and the electrical connections of such single unit equipments with which I am familiar are extremely intricate and difficult to understand, making the corrections of troubles impossible to all but those having special knowledge of the particular apparatus involved. Further than this, the single unit dynamo is often too large to be installed in many automobiles.

In instances where separate units, motors and generators are employed, their location in different places in the vehicle is possible, but at the expense of doubling the mechanical connections and supports and complicating the electrical connections. The location of such units seriously interferes with the accessibility of parts of the equipment and makes a difficult and unsightly arrangement.

Other motor generators which have been proposed, with which I am familiar, have their units so disposed that it is impossible to so shape the carcass that it can be installed in the small space available in many automobiles, and, if the units are made smaller to permit of their installation in such contracted space, they do not have sufficient capacity or mechanical strength to properly serve their purposes. In such other motor generators, also, the gearing and mechanical connections are complicated and expensive.

In my invention, I have provided a motor generator which has ample capacity for its duties; is small and compact; is contained in a casing of one diameter; is easily installed and supported on the engine frame; has only one driving connection to the engine shaft; has its motor geared to deliver a powerful torque at slow speed to the common shaft which is in driving connection with the engine shaft; has its generator arranged so that its armature may revolve at high speed independent of the motor armature and of the gearing which connects them; is provided with a single overrunning clutch which permits the motor armature and reduction gearing to stand still, while the generator is being driven by the gasolene engine; and is easily manufactured at low cost.

These and other advantages are secured by my invention for which I claim:—

1. An electric motor generator for starting and lighting gasolene automobiles consisting of a motor unit and a generator unit arranged end to end, having a common shaft on which the generator armature is mounted, and a hollow shaft surrounding the common shaft, the hollow shaft carrying and being driven by the motor armature, the common shaft being provided at one end with means for making a driving connection from it to the gasolene engine shaft and at the other end carrying an overrunning clutch, and reduction gearing between the hollow shaft and the overrunning clutch, said clutch being adapted to transmit motion from the hollow shaft to the common shaft in one direction only.

2. In an electric motor generator, a motor unit and a generator unit having casings arranged end to end, a common shaft extending through both casings, bearings for the common shaft, end housings for the bearings for the common shaft supported by the casings, a hollow shaft surrounding the common shaft within the motor unit, bearings for the hollow shaft intermediate the bearings for the common shaft, housings for the bearings for the hollow shaft supported by the casings, an armature for the generator unit mounted upon the common shaft, an armature for the motor unit mounted upon the hollow shaft, reduction gearing between the hollow shaft and the common shaft and an overrunning clutch between the common shaft and the reduction gearing.

In testimony whereof I affix my signature in presence of two witnesses.

FRANK B. RAE.

Witnesses:
  GEORGE A. MOWERY,
  FRANCES M. HAND.